Nov. 15, 1966     J. R. CURRAN     3,285,287
PRESSURE EQUALIZING PLURAL VALVE STRUCTURE
Filed July 17, 1963
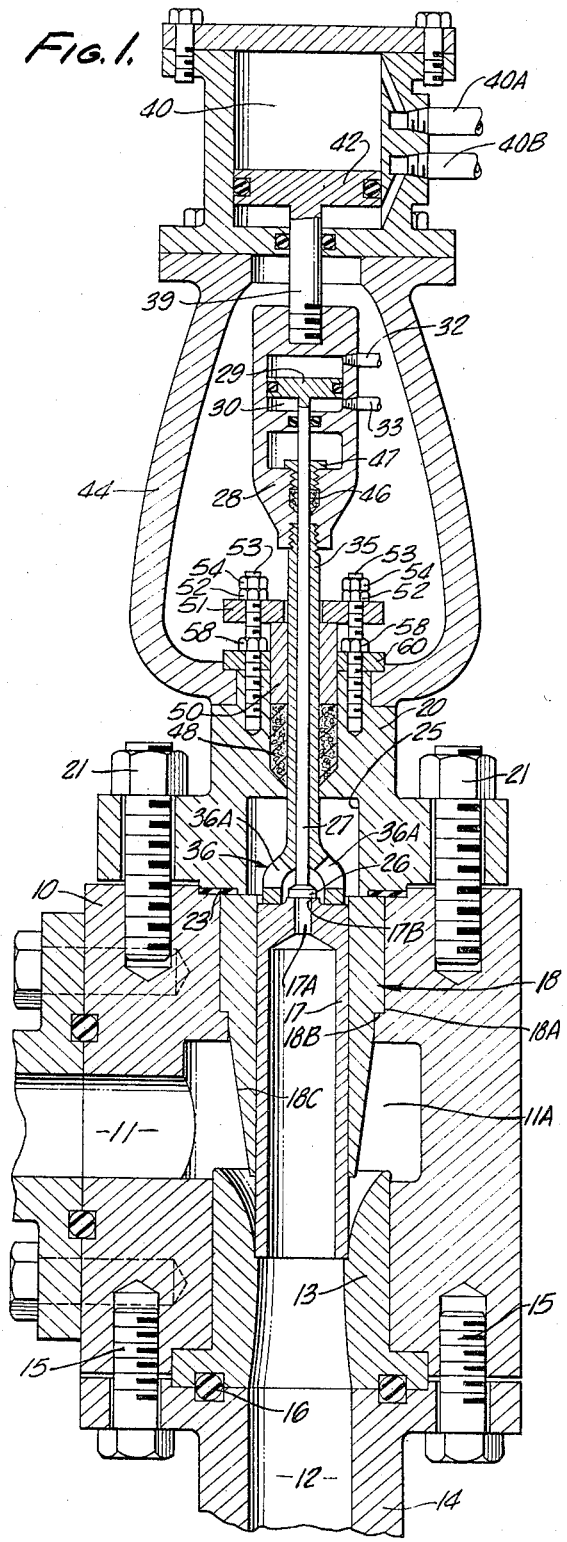
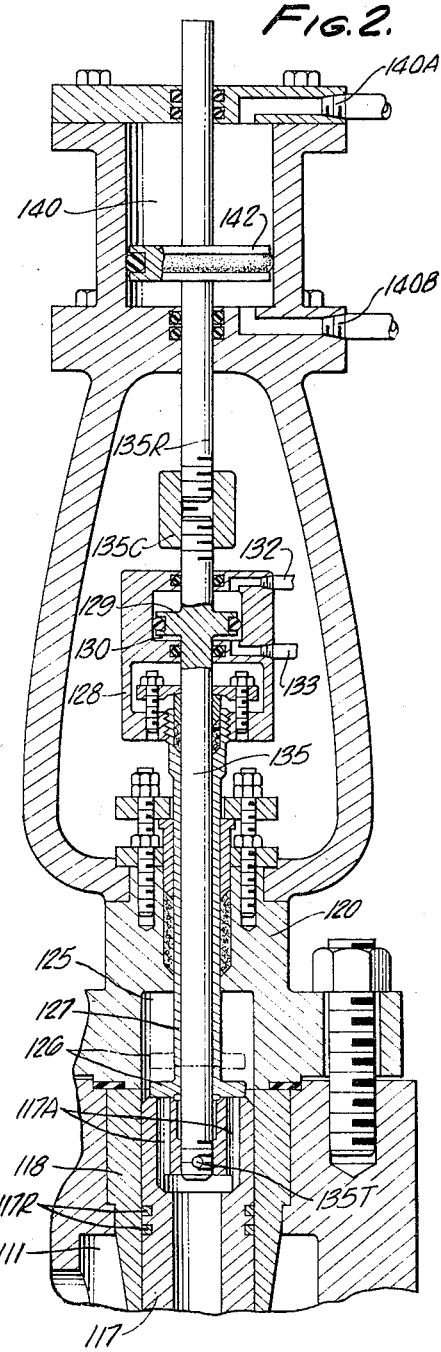
INVENTOR.
JOHN R. CURRAN
BY
ATTORNEYS United States Patent Office 3,285,287
Patented Nov. 15, 1966

3,285,287
PRESSURE EQUALIZING PLURAL VALVE
STRUCTURE
John R. Curran, North Scituate, R.I., assignor, by mesne
assignments, to International Telephone and Telegraph
Corporation, New York, N.Y., a corporation of Maryland
Filed July 17, 1963, Ser. No. 295,703
14 Claims. (Cl. 137—630)

Briefly the composite valve structures described herein involve generally a casing having an inlet and an outlet chamber and a reciprocal valve element in the general form of a hollow open-ended cylinder seatable on a seat located at one end of travel of the cylinder, the other end of the cylinder being closable by a coaxial pilot valve on the cylinder located within a so-called leakage chamber in the casing to which fluids may leak from the inlet chamber to such leakage chamber for purpose of utilizing the gas presure in the inlet chamber to seat both the pilot valve and the main cylindrically shaped valve element. A novel arrangement is provided for operating the pilot valve and the main cylindrical valve element and this arrangement involves a pair of piston-cylinder assemblies each coaxially arranged with respect to the axis of movement of the pilot valve and also the axis of the main cylindrical valve element. The movable element of one of the piston-cylinder assemblies serves to operate the pilot valve; and a movable element of the other piston-cylinder assembly serves to operate the main cylindrical valve element. In one form of the invention, the pilot valve is operated by a stem which is slidably mounted in a tube which serves as an actuating member for the main cylindrical valve element; and in a different form of the invention, an outer sleeve is used as an actuating member for the pilot valve and a stem, internally of said sleeve, serves as an actuating member for the main cylindrical element. In each case movement of the cylindrical valve element is accompanied by movement of the pilot valve.

It is therefore a general object of the present invention to provide an improved valve structure having features indicated above.

A specific object of the present invention is to provide a valve structure capable of handling high pressure fluids over a wide range of temperatures.

Another specific object of the present invention is to provide a valve structure involving a novel arrangement of parts whereby the pressure in an inlet chamber is used to seat a main valve element and a pilot element seated on such main valve element.

Another specific object of the present invention is to provide a valve structure of this character characterized by its simplicity of construction which also allows instrumentation required to open and close the pilot valve to be very simple.

Another specific object of the present invention is to provide new teachings and techniques embodied in a novel construction which, using a basic concept, allows valves to be made of different sizes.

Another specific object of the present invention is to provide a construction of this character in which improper sequential operation of the pilot and main valve elements produces no harmful or objectionable effects.

Another specific object of the present invention is to provide a valve structure of this character featured by coaxiality not only in the valve elements themselves but also in the actuating mechanisms therefor.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 is generally a longitudinal sectional view through a composite valve structure embodying features of the present invention.

FIGURE 2 illustrates a modification of the present invention.

Referring to the preferred form of invention shown in FIGURE 1, the same includes a valve body or casing 10 which defines a pressure inlet chamber 11 and a presure outlet chamber 12 in the form of perpendicularly extending bores. A removable valve seat 13 is retained by an outlet conduit 14 bolted to the casing 10 by means of bolts 15 with suitable sealing means such as, for example, an O ring 16 between valve seat insert 13 and the bolted conduit 14.

Cooperating in sealing engagement with the valve seat 13 is a generally cylindrical and hollow open-ended reciprocable valve element 17 which is guided in its movement by the removable valve guide 18 having an upper cylindrical portion 18A terminating at shoulder 18B and an integrally formed lower conical portion 18C which extends approximately in elevation, to the upper edge of the valve seat 13.

The valve guide 18 has its shouldered portion 18B retained against an inner cooperating shouldered portion of the casing 10 by an annular closure or cap member 20 which is bolted by bolts 21 to the casing 10 with suitable annular sealing means 23 between the closure member 20 on the one hand and guide member 18 and casing 10 on the other hand.

The closure member 20 is provided with a bore or chamber 25 in coaxial relationship with respect to the internal bore of guide 18, and for purposes of reference and definition, this chamber 25 is referred to herein either as a pilot valve chamber or a leakage chamber since in the latter respect, in the closed position of the valve as illustrated in FIGURE 1, high pressure from inlet chamber 11 may leak into chamber 25 through a path which includes the small space between the outer surface of valve element 17 and the inner surface of its guide 18.

The valve element 17 is provided with a coaxial bore 17A, the upper end of which defines a valve seat 17B for the reciprocable pilot valve element 26 which is in the form of an enlarged head on the lower end of a stem or a rod 27 which sealingly extends through the cylinder housing 28 and is connected rigidly to a piston member 29 having its outer surface sealingly engaging the cylindrical wall of cylinder chamber 30.

The cylinder 30 is in communication at its upper end with a flexible hose or conduit 32 and its lower end is in communication with a like flexible hose or conduit 33 for producing either up or down movement of the piston 29 and the pilot valve element 26 connected thereto.

For these purposes, it will be seen in FIGURE 1 that the stem or rod 27 is coaxial with the valve element 17 and is slidably mounted in a guide tube 35 having its upper end threaded in the cylinder housing 28 and having its lower end formed generally cup-shaped in the form of a yoke member 36, such yoke member 36 being apertured at 36A and being bolted to the valve element 17.

This tubular member 35 serves an additional function in that it serves as an actuating element for the valve element 17 and for that purpose the same is rigidly connected through cylinder housing 28 to the lower end of piston rod 39 which sealingly extends through a wall of the cylinder 40 within which is the piston 42 connected to such rod 39. Pressure may be introduced into cylinder 40 either through the top port 40A or the lower port 40B, for producing up and down movement of piston 42 and the valve element 17 rigidly connected thereto, it being noted that the cylinder 40 itself is stationarily mounted on an open frame member 44 which has its lower end bolted to the upper end of closure member 20.

It will also be seen that the rod or stem 27 sealingly extends into the cylinder housing 28, a conventional stuffing box involving packing material 46 and a packing nut 47 being provided for that purpose. In like manner, the tubular actuating member 35 sealingly extends through the closure member 20 and for that purpose there is provided packing material 48 compressed by a sleeve member 50 which is retained by a ring-shaped member 51, the member 51 being releasably and adjustably maintained by nuts 52 threaded on the fastening screws or bolts 53. The screws or bolts 53 have also threaded thereon the lock nuts 54 and nuts 58 which engage the apertured washer member 60 for the purposes of retaining the frame member 44 on the closure member 20.

In explaining the operation of the valve structure shown in FIGURE 1, it is initially assumed that the valve is in its closed position as illustrated in FIGURE 1, i.e., the lower end of the valve element 17 is seated against its seat 13 and the pilot valve element 26 is seated against its seat 17B. These two valve elements 17 and 26 tend to be seated against their respective seats by pressure within chamber 25, such pressure being communicated from the inlet chamber 11 to the chamber 25 through the small annular space between valve element 17 and its guide 18. Since this pressure in chamber 25 is greater than the pressure in the outlet chamber 12, both valve elements 26 and 17 are urged downwardly against their respective seats.

The first step in opening the composite valve involves opening of the pilot valve 26, 17B to achieve substantial equalization in pressure between chamber 25 and chamber 12, i.e., to substantially balance pressure forces on the valve element 17. For this purpose the pilot valve element 26 is moved upwardly by applying hydraulic fluid under pressure through flexible hose 33 to the bottom side of piston 29 to effect its upward movement, the fluid in the upper part of cylinder 30 being displaced and flowing out through flexible hose 32. By thus initially opening the pilot valve 26, 17B, the mechanical forces otherwise required to move the valve element 17 are greatly reduced. The valve element 17 is then moved upwardly to open the valve 17, 13, by applying hydraulic fluid under pressure through port 40B to the lower side of piston 42 and the valve element 17 connected thereto, during which time fluid in the upper part of cylinder 40 is displaced and flows out of the cylinder through port 40A. It will be observed that since piston 42 is connected to the cylinder housing 28, it moves upwardly with the piston 42 and valve element 17, i.e., the pilot valve element 26, in its open position moves upwardly with the valve element 17.

The composite valve structure may then be closed by first closing the valve element 17 on its seat 13, followed by closing of the pilot valve element 26 on its seat 17B. This may be accomplished by applying hydraulic fluid under pressure through port 40A to the upper part of cylinder 40, i.e., on the top side of piston 42 with the displaced fluid exiting through port 40B. After the valve element 17 is thus seated on its seat 13, the pilot valve element 26 may be closed by applying hydraulic fluid under pressure to the top side of piston 29 through flexible hose 32 with the displaced fluid exiting through the flexible hose 33. When the pilot valve element 26 is thus seated, there is slight leakage in pressure from the inlet chamber 11 to the pilot valve chamber 25, through the small opening between valve element 17 and its guide 18 and such pressure builds up in chamber 25 to produce an unbalanced force, acting downwardly, on both valve elements 26 and 17 tending to seat them against their respective seats 17B and 13.

Should the valve closing sequence described above, through inadvertence or otherwise, be altered such that the valve 26, 17B is closed before the valve 17, 13 is closed, the main valve element 17 would not slam shut because the speed with which it could be forced to the closed position depends upon the leakage of gas or liquid from the inlet chamber 11 into the chamber 25. The leakage between the valve element 17 and its guide 18 is so small that it would take several seconds for pressure to be developed in the chamber 25 sufficiently to move the valve element 17 to its closed position, under this assumed condition wherein the pilot valve element 26 is closed before the valve element 17 is seated.

The lower end of the valve element 17 is purposely provided with a so-called blunt end as disclosed for purposes of showing a uniform distribution of pressure across the end of the plug 17 substantially regardless of its position. Also the valve seat 13 is tapered at its upper end as shown in the drawings for achieving a desired lift to the valve element 17 during its opening movement.

It will be appreciated that many uses for the composite valve structure described herein are suggested to those skilled in the art. For example, the valve may be used to control or regulate pressures at, for example, 5000 lbs. per sq. in., with for example, the outside diameter of the valve element 17 being 10 inches. The valve may be made to modulate in response to a fixed set pressure which is to be maintained in, for example, a Dewar flask, or may be used to establish various pressure that are programmed into an electronic control system by means of magnetic tape. The piston-cylinder assembly 40, 42, may be part of a servo system using signals derived from pressure conditions on the downstream side of the valve.

In the modified arrangement shown in FIGURE 2, parts which have the same general function and purpose as described above in connection with FIGURE 1, have, for purposes of comparison, the same reference numerals increased, however, by one hundred. Thus, for example, the valve element 117 in FIGURE 2 corresponds generally to the valve element 17 in FIGURE 1. However, instead of being provided with a single equalizing bore 17A, the valve element 117 has four circumferentially arranged pressure equalizing bores 117A, each having valve seats formed at their upper ends against which the modified pilot valve element 126 is seated. Even though piston rings 117R are recessed within the valve element 117, there is still sufficient leakage between inlet pressure chamber 111 and the pilot valve or leakage chamber 125 for developing a seating pressure in chamber 125 which tends to seat the valve elements 126 and 117. The actuating element for the pilot valve 126 is illustrated as a tube 127 which sealingly extends through the closure member 120 and is attached at its upper end to the cylinder housing 128. The actuating element for the valve element 117 comprises the stem or rod 135 which has its lower end fitted into the valve element 117 and secured in that condition by pin 135T. The upper end of rod 135 extends sealingly through the cylinder housing 128 and comprises the piston rod for a piston 129 in cylinder 130, and such rod 135 is extended and coupled by means of coupling 135C to the piston rod 135R of piston 142 in cylinder 140.

Whereas in FIGURE 1 application of fluid pressure to the cylinder 30 produces movement on the piston 29 therein, in contrast, in FIGURE 2, application of fluid pressure to the cylinder 140 produces movement of the cylinder 130. Application of fluid pressure to the cylinder 140 produces joint movement of the piston 129 and cylinder 130 and thus, as in FIGURE 1, movement of the main valve element 117 is accompanied by joint movement of the pilot valve element 126.

The arrangement shown in FIGURE 1 is preferred because the tube 35 can be made smaller in diameter than the tube 127 in FIGURE 2. Otherwise, the operation of the arrangement in FIGURE 2 is as described above in connection with FIGURE 1.

It will be appreciated that the pistons 42 and 29 may be operated by any suitable gas or liquid medium under pressure and also instead of providing the pistons 42 and 29 with stems 39 and 27 respectively, such stems may have other means connected thereto as, for example, a hand wheel for manual operation or an electric motor drive for producing the desired axial movement of these stems.

The valve element 17 illustrated with a lower blunt end cooperating with seat 13 is particularly useful for control of gas and, for liquid control, it is preferred to substitute this particular valve structure with a valve structure following the teachings in my United States Letters Patent 2,918,087 issued December 22, 1959.

Thus, for example, the valve guide 18 and valve seat 13 may be replaced by a single sleeve within which the valve element 17 is slidably mounted and moved using the means described above; and in such case such sleeve has closely spaced drilled and tapped holes extending through that portion of its side wall within chamber 11A with the interior of such tube, such holes being spaced in a series extending circumferentially of the sleeve with each such series of holes being spaced longitudinal from a like series of circumferential holes such that when and as the valve element 17 is moved towards its valve closing position progressively more and more of such series of holes are closed by valve element 17 to progressively close the valve and ultimately in the fully closed position of valve element 17 it covers all of such holes and shuts off all fluid flow from inlet chamber 11 to outlet chamber 12.

One of the important features of the present invention involves the fact that relative motion between the pilot valve element 26 and the main valve plug 17 is controlled by actuating means involving stem 27. Undesired relative motion cannot be caused by static or dynamic forces acting upon the valve plug 17 or the pilot valve element 26.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a valve construction, a valve housing having an inlet chamber, an outlet chamber, a pilot chamber and a first valve seat between said inlet and outlet chambers; a movable valve element seatable on said first seat; said valve element having a portion thereof defining a wall portion of said pilot chamber and having a portion thereof defining a pilot valve seat for communicating said pilot chamber with said outlet chamber; a pilot valve element in said pilot chamber seatable on said pilot valve seat; first means defining a restricted passageway communicating said inlet chamber to said pilot chamber; second means mounted on said housing for operating said pilot valve element independent of the pressure of the fluid controlled by said valve construction; and third means mounted on said housing for operating said movable valve element to any desired position from fully open to fully closed, said third means being operable independently of said second means and independently of the pressure of the fluid controlled by said valve construction.

2. A construction as set forth in claim 1 wherein said movable valve element is in the form of an open-ended cylindrical member, said pilot valve element being mounted coaxially with respect to said cylindrical member; and said second and third means comprise a pair of relatively movable coaxially extending actuating elements, each of which are coaxial with respect to said cylindrical member and said pilot valve element.

3. A construction as set forth in claim 1 in which said second means comprises a first fluid motor mounted on said housing, said third means comprises a second fluid motor mounted on said housing, and a pair of coaxially extending actuating elements with one of said elements connecting said pilot valve element to said first fluid motor and with the other one of said elements connecting said second movable valve element to said second fluid motor.

4. A construction as set forth in claim 3 in which said one actuating element comprises a rod extending coaxially through a tubular element comprising said other actuating element.

5. A construction as set forth in claim 3 in which said one actuating element comprises a tubular element through which a rod comprising said other actuating element extends.

6. A construction as set forth in claim 1 in which said movable valve element comprises generally a cylindrical element having a blunt end which is movable into said first valve seat, said first valve seat being tapered to provide lift on said movable valve element when and as said movable valve element leaves said first valve seat.

7. In a valve construction, a valve housing having an inlet chamber, an outlet chamber, a third chamber and a first valve seat between said inlet and outlet chambers; a movable valve element seatable on said first seat; said valve element having a portion thereof defining a wall portion of said third chamber and having a portion thereof defining a second valve seat for communicating said third chamber with said outlet chamber; a pilot valve element in said third chamber seatable on said second valve seat; first means defining a restricted passageway communicating said inlet chamber to said third chamber; second means mounted on said housing for operating said pilot valve element; third means mounted on said housing for operating said movable valve element; said second means being operated independently of operation of said third means; and operation of said third means produces movement of both said movable valve elements and said pilot valve element.

8. In a valve construction, a valve housing having an inlet chamber, an outlet chamber, a third chamber and a first valve seat between said inlet and outlet chambers; a movable valve element seatable on said first seat; said valve element having a portion thereof defining a wall portion of said third chamber and having a portion thereof defining a second valve seat for communicating said third chamber with said outlet chamber; a pilot valve element in said third chamber seatable on said second valve seat; first means defining a restricted passageway communicating said inlet chamber to said third chamber; second means mounted on said housing for operating said pilot valve element; third means mounted on said housing for operating said movable valve element; said second means comprising a first fluid motor mounted on said housing, said third means comprises a second fluid motor mounted on said housing, and a pair of coaxially extending actuating elements with one of said elements connecting said pilot valve element to said first fluid motor and with the other one of said elements connecting said movable valve element to said second fluid motor; operation of said first fluid motor moving said pilot valve element and operation of said second fluid motor producing joint movement of said pilot valve element and said movable valve element.

9. In a valve construction, a valve housing having an inlet chamber, an outlet chamber, a third chamber and a first valve seat between said inlet and outlet chambers; a movable valve element seatable on said first seat; said valve element having a portion thereof defining a wall portion of said third chamber and having a portion thereof defining a second valve seat for communicating said third chamber with said outlet chamber; a pilot valve element in said third chamber seatable on said second valve seat; first means defining a restricted passageway communicating said inlet chamber to said third chamber; second means mounted on said housing for operating said pilot valve element; third means mounted on said housing for operating said movable valve element; and a guide element mounted in said housing for guiding movement of said movable valve element; said first means being defined by a space between said guide element and said movable valve element.

10. In a valve construction, a valve housing having an inlet chamber, an outlet chamber, a third chamber and a first valve seat between said inlet and outlet chambers; a movable valve element seatable on said first seat; said valve element having a portion thereof defining a wall portion of said third chamber and having a portion thereof defining a second valve seat for communicating said third chamber with said outlet chamber; a pilot valve element in said third chamber seatable on said second valve seat; first means defining a restricted passageway communicating said inlet chamber to said third chamber; second means mounted on said housing for operating said pilot valve element; and third means mounted on said housing for operating said movable valve element; said housing comprising a valve body with a closure member mounted thereon and in which said third chamber is defined by an opening in said closure member; a pair of actuating elements comprising a rod within a tubular member and extending through said closure member into said opening and forming a part of said second and third means with one of said actuating elements being connected to said pilot valve element and the other one of said actuating elements being connected to said movable valve element; sealing means on said closure member sealing the passage of said tubular member therein; a frame structure mounted on said closure member; a pair of fluid motors comprising a part of said second and third means and mounted on said frame structure with each having a movable element and a relative stationary element and with the movable element of one of said fluid motors being connected to the relative stationary element of the other of said fluid motors and also that that particular actuating element which is connected to said movable valve element; and sealing means on the other of said fluid motors sealing the passage of said rod therein; said rod being connected to one of said elements of said other fluid motor.

11. A construction as set forth in claim 10 in which said rod is connected rigidly to said pilot valve element and to the movable element of said other fluid motor; said tubular element being rigidly connected to said movable valve element, the relatively stationary element of said other fluid motor and also to the movable element of said one fluid motor.

12. A construction as set forth in claim 10 in which said tubular element is connected rigidly to said pilot valve element and to the movable element of said other fluid motor; said rod being rigidly connected to said movable valve element, the relatively stationary element of said other fluid motor and also to the movable element of said one fluid motor.

13. A construction as set forth in claim 10 in which said movable elements of said fluid motors and said pilot valve and said movable valve element and said rod and tubular elements are movable along the same axis.

14. In a valve construction, a valve housing having an inlet chamber, an outlet chamber, a third chamber and a first valve seat between said inlet and outlet chambers; a movable valve element seatable on said first seat; said valve element having a portion thereof defining a wall portion of said third chamber and having a portion thereof defining a second valve seat for communicating said third chamber with said outlet chamber; a pilot valve element in said third chamber seatable on said second valve seat; first means defining a restricted passageway communicating said inlet chamber to said third chamber; second means mounted on said housing for operating said pilot valve element; third means mounted on said housing for operating said movable valve element; and including means for producing joint movement of said second and third means upon operation of said third means and for producing independent movement of said second means upon operation of said second means.

References Cited by the Examiner

UNITED STATES PATENTS

| | | | |
|---|---|---|---|
| 1,867,195 | 7/1932 | Teller | 137—630.14 |
| 1,882,392 | 10/1932 | Musgrave | 137—630 |

FOREIGN PATENTS 483,835  4/1938  Great Britain.

WILLIAM F. O'DEA, *Primary Examiner.*

CLARENCE R. GORDON, *Examiner.*